United States Patent
An et al.

(10) Patent No.: US 11,687,359 B2
(45) Date of Patent: Jun. 27, 2023

(54) HYBRID MEMORY MANAGEMENT APPARATUS AND METHOD FOR MANY-TO-ONE VIRTUALIZATION ENVIRONMENT

(71) Applicant: ELECTRONICS AND TELECOMMUNICATIONS RESEARCH INSTITUTE, Daejeon (KR)

(72) Inventors: Baik-Song An, Daejeon (KR); Hong-Yeon Kim, Daejeon (KR); Sang-Min Lee, Daejeon (KR); Myung-Hoon Cha, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 43 days.

(21) Appl. No.: 17/524,441

(22) Filed: Nov. 11, 2021

(65) Prior Publication Data
US 2022/0147462 A1  May 12, 2022

(30) Foreign Application Priority Data
Nov. 12, 2020  (KR) .................. 10-2020-0151106

(51) Int. Cl.
*G06F 12/00* (2006.01)
*G06F 9/455* (2018.01)
(Continued)

(52) U.S. Cl.
CPC .......... *G06F 9/45558* (2013.01); *G06F 3/067* (2013.01); *G06F 3/068* (2013.01);
(Continued)

(58) Field of Classification Search
None
See application file for complete search history.

(56) References Cited

U.S. PATENT DOCUMENTS 9,020,801 B2   4/2015  Fultheim et al.
2017/0192686 A1*  7/2017  Niu .................. G06F 3/0644
(Continued)

FOREIGN PATENT DOCUMENTS

KR   1020150089747 A   8/2015
KR   1020150097981 A   8/2015

*Primary Examiner* — Daniel D Tsui (57) ABSTRACT

Disclosed herein are a hybrid memory management apparatus and method for an many-to-one virtualization environment. The hybrid memory management apparatus is implemented in an inverse-virtualization-based multi-node computing system including multiple physical nodes, each containing hybrid memory in which DRAM and NVRAM coexist, a virtual machine, and hypervisors, and includes memory for storing at least one program, and a processor for executing the program, wherein the program includes a remote request service module for processing a page-related request with reference to the hybrid memory and responding to the page-related request by transmitting a result of processing, an internal request service module for processing an internal page fault request with reference to a hybrid memory and responding to the internal page fault request, and a data arrangement module for responding to an inquiry request for a location at which a newly added page is to be arranged in the hybrid memory.

18 Claims, 8 Drawing Sheets

(51) Int. Cl.
   *G06F 12/0891* (2016.01)
   *G06F 12/0882* (2016.01)
   *G06F 3/06* (2006.01)

(52) U.S. Cl.
   CPC .......... *G06F 3/0619* (2013.01); *G06F 3/0647* (2013.01); *G06F 12/0882* (2013.01); *G06F 12/0891* (2013.01); *G06F 2009/45583* (2013.01); *G06F 2009/45595* (2013.01)

(56) References Cited

U.S. PATENT DOCUMENTS

| | | |
|---|---|---|
| 2017/0242822 A1 | 8/2017 | Malladi et al. |
| 2019/0294356 A1* | 9/2019 | Caraccio ............. G06F 12/0246 |
| 2020/0174817 A1* | 6/2020 | Ding ..................... G06F 9/5077 |
| 2021/0224096 A1* | 7/2021 | Zhou ................... G06F 13/4221 |

* cited by examiner

HYBRID MEMORY MANAGEMENT APPARATUS AND METHOD FOR MANY-TO-ONE VIRTUALIZATION ENVIRONMENT

CROSS REFERENCE TO RELATED APPLICATION

This application claims the benefit of Korean Patent Application No. 10-2020-0151106, filed Nov. 12, 2020, which is hereby incorporated by reference in its entirety into this application.

BACKGROUND OF THE INVENTION

1. Technical Field

The following embodiments relate generally to technology for managing hybrid memory in which memory devices having various characteristics are contained in each node in an many-to-one virtualization environment in which multiple computing nodes are combined and abstracted into a single virtual machine.

2. Description of the Related Art

With the development of memory technology, technologies related to various types of memory devices as well as existing Dynamic Random Access Memory (DRAM)-based main memory have already been commercialized or are about to be commercialized. Representatively, there are Phase-change Memory (Phase-change RAM: PRAM), Spin Transfer Torque Magnetoresistive RAM (STT-MRAM), etc., and Intel 3D Xpoint product groups are based on phase-change memory technology.

The common characteristics of such next-generation memory technology may be regarded as nonvolatility, which means that, when power is interrupted, data is retained without change, unlike DRAM, in which stored data is lost when power is interrupted. However, in the case of performance, in particular, access latency, nonvolatile memory tends to have latency performance that is inferior to DRAM, and has a great difference in write latency performance from DRAM. Therefore, it is rare to use nonvolatile memory alone, and in most cases, nonvolatile memory is generally used together with existing DRAM in the form of hybrid memory.

Existing virtualization technology is configured to partition the resources of a single computing node and to view the same in the form of multiple virtual machines. However, recently, with the rapid increase in requirements for computing and memory resources by applications, many-to-one virtualization technology of, unlike existing virtualization, combining and abstracting multiple computing resources into a single virtual machine has appeared and attracted attention. When many-to-one virtualization technology is applied, existing applications may be executed in parallel while going beyond the boundaries of physical nodes. During this procedure, sharing memory between nodes essentially occurs. In addition, guest operating system (OS) code is also executed in parallel at multiple nodes, and efficient processing of tasks involving memory sharing caused by parallel execution must be enabled. Similar to existing virtualization, many-to-one virtualization also requires a virtual machine manager (hypervisor) which abstracts the resources of respective nodes, and memory sharing and management between nodes is generally performed by the virtual machine manager.

Many-to-one virtualization technology that has been released to date has been designed and implemented on the premise that only single-layer memory, that is, DRAM, for each node is contained in a system. Because a system in which hybrid memory including nonvolatile memory or the like is contained must additionally consider movement (migration), duplication, and management of memory data between memory layers at a node, an optimized memory manager for accurately recognizing such considerations and performing operations must be supported. Therefore, there is required new memory management software (SW) technology which can guarantee optimal performance by recognizing and considering all of multiple memory layers of hybrid memory between nodes and within each node.

PRIOR ART DOCUMENTS

Patent Documents (Patent Document 1) U.S. Pat. No. 9,020,801

SUMMARY OF THE INVENTION

An embodiment is intended to efficiently manage memory data between multiple memory layers between nodes or within each node in an many-to-one virtualization environment in which multiple computing nodes based on hybrid memory in which memory devices having various characteristics are contained are combined and abstracted into a single virtual machine, thus supporting optimization so that effective optimization with regard to, for example, performance, memory capacity, and energy consumption, is enabled.

In accordance with an aspect, there is provided a hybrid memory management apparatus for an many-to-one virtualization environment, the hybrid memory management apparatus being a memory management apparatus in an inverse-virtualization-based multi-node computing system including multiple physical nodes, each containing a hybrid memory in which two or more different types of memory devices coexist, a virtual machine in which resources of the multiple physical nodes are virtualized, and hypervisors for abstracting respective resources of the physical nodes into the virtual machine and corresponding to respective physical nodes, wherein the hybrid memory management apparatus is implemented in each of the hypervisors to manage the hybrid memory, the hybrid memory management apparatus including a memory for storing at least one program, and a processor for executing the program, wherein the program includes a remote request service module for processing a page-related request received from a remote node with reference to the hybrid memory and responding to the page-related request by transmitting a result of processing to the remote node, an internal request service module for processing an internal page fault request received from the virtual machine with reference to a hybrid memory of a local or remote node and responding to the internal page fault request by transmitting a result of processing to the virtual machine, and a data arrangement module for responding to an inquiry request for a location at which a newly added page is to be arranged in the hybrid memory, the inquiry request being made by the internal request service module.

The remote service request module may perform determining whether a memory request received from a remote node is a read request or an invalidation request for page data stored in the remote node, and selectively performing, based on a result of the determination, any one of an operation of reading the corresponding page with reference to the hybrid memory and then transmitting the read page to the remote node, which transmitted the memory request, and an operation of invalidating the corresponding page with reference to the hybrid memory and thereafter notifying the remote node, which transmitted the memory request, that invalidation has been completed over a network.

The internal request service module may perform, when an internal page fault is generated by the virtual machine, checking whether the internal page fault is a fault related to a read request or a write request, and selectively performing, based on a result of the checking, any one of an operation of, if the internal page fault is found to be a fault related to a read request, requesting page data from a remote mode having a latest copy of the corresponding page, and requesting the data arrangement module to arrange and store a new page that is the corresponding page in the hybrid memory when the requested page is received over a network, and an operation of, if the internal page fault is found to be a fault related to a write request, writing data for which the write request is generated to the corresponding page, and requesting invalidation of all of page copies present in other nodes.

The internal request service module may further perform when the internal page fault is found to be the fault related to the write request, determining whether the corresponding page is already present in the hybrid memory, and when the corresponding page is not present in the hybrid memory, requesting page data from a remote node having a latest copy of the corresponding page, and requesting the data arrangement module to arrange and store the new page that is the corresponding page in the hybrid memory when the requested page is received over the network.

The two or more different types of memory devices may include a Dynamic Random Access Memory (DRAM) and a Nonvolatile RAM (NVRAM), and the data arrangement module may perform, when a request to arrange a new page is generated by the internal request service module, allocating the new page to an available space, to which the new page is allocable, in an area of the DRAM, performing mapping of the allocated new page to a user address space, and notifying the internal request service module of completion of processing of the arrangement request.

The data arrangement module may further perform when an available space to which the new page is allocable is not present in the area of the DRAM, determining whether an available space is present in an area of the NVRAM, selecting a victim page to be migrated to the available space in the area of the NVRAM from among existing pages present in the DRAM, and after causing the selected victim page to migrate to the available space, again performing mapping of the corresponding page attributable to a change in a physical address.

Selecting the victim page may be configured to select the victim page based on a Least Recently Used (LRU) algorithm or a Least Frequently Used (LFU) algorithm.

The data arrangement module may perform declaring out-of-memory when an available space is not present in the area of the NVRAM either.

The two or more different types of memory devices may include a DRAM and an NVRAM, and the data arrangement module may include, with initiation of a reallocation task, when N available pages are present in an available space of an area of the DRAM, selecting a number of target NVRAM pages to be migrated to the DRAM as N, and after causing the selected NVRAM pages to migrate to the DRAM, again performing mapping of the corresponding pages.

The data arrangement module may further perform, when no available space is present in the area of the DRAM, selecting a number of target DRAM pages to be migrated to the NVRAM as M, and causing the selected M DRAM pages to migrate to the NVRAM, selecting a number of target NVRAM pages to be migrated to the DRAM as N, and after causing the selected NVRAM pages to migrate to the DRAM, and again performing mapping of the corresponding pages.

The data arrangement module may be configured to, when selecting the number of the target NVRAM pages to be migrated as N or selecting the number of the target DRAM pages to be migrated as M, select the number based on a Most Recently Used (MRU) algorithm or a Most Frequently Used (MFU) algorithm in which a frequency of recent access or an accumulated number of accesses is taken into consideration.

In accordance with another aspect, there is provided a hybrid memory management method for an many-to-one virtualization environment, the hybrid memory management method being performed by a memory management apparatus implemented in each hypervisor in an inverse-virtualization-based multi-node computing system including multiple physical nodes, each containing a hybrid memory in which two or more different types of memory devices coexist, a virtual machine in which resources of the multiple physical nodes are virtualized, and hypervisors for abstracting respective resources of the physical nodes into the virtual machine and corresponding to respective physical nodes, the hybrid memory management method including determining whether a memory request received from a remote node is a read request or an invalidation request for page data stored in the remote node, and selectively performing, based on a result of the determination, any one of an operation of reading the corresponding page with reference to the hybrid memory and then transmitting the read page to the remote node, which transmitted the memory request, and an operation of invalidating the corresponding page with reference to the hybrid memory and thereafter notifying the remote node, which transmitted the memory request, that invalidation has been completed over a network.

In accordance with a further aspect, there is provided a hybrid memory management method for an many-to-one virtualization environment, the hybrid memory management method being performed by a memory management apparatus implemented in each hypervisor in an inverse-virtualization-based multi-node computing system including multiple physical nodes, each containing a hybrid memory in which two or more different types of memory devices coexist, a virtual machine in which resources of the multiple physical nodes are virtualized, and hypervisors for abstracting respective resources of the physical nodes into the virtual machine and corresponding to respective physical nodes, the hybrid memory management method including, when an internal page fault is generated by the virtual machine, checking whether the internal page fault is a fault related to a read request or a write request, and selectively performing, based on a result of the checking, any one of an operation of, if the internal page fault is found to be a fault related to a read request, requesting page data from a remote mode having a latest copy of the corresponding page, and arranging and storing a new page that is the corresponding page in the hybrid memory when the requested page is received over a network, and an operation of, if the internal page fault is found to be a fault related to a write request, writing data for which the write request is generated to the corresponding page, and requesting invalidation of all of page copies present in the remote node.

Requesting the invalidation may include when the internal page fault is found to be the fault related to the write request, determining whether the corresponding page is already present in the hybrid memory, and when the corresponding page is not present in the hybrid memory, requesting page data from a remote node having a latest copy of the corresponding page, and arranging and storing the new page in the hybrid memory when the requested page is received over the network.

The two or more different types of memory devices may include a dynamic random access memory (DRAM) and a nonvolatile RAM (NVRAM), and the hybrid memory management method may further include, when the new page is arranged and stored in the hybrid memory, allocating the new page to an available space, to which the new page is allocable, in an area of the DRAM, and performing mapping of the allocated new page to a user address space.

The hybrid memory management method may further include, when the new page is arranged and stored in the hybrid memory, if an available space to which the new page is allocable is not present in the area of the DRAM, determining whether an available space is present in an area of the NVRAM, selecting a victim page to be migrated to the available space in the area of the NVRAM from among existing pages present in the DRAM, and after causing the selected victim page to migrate to the available space in the area of the NVRAM, again performing mapping of the corresponding page attributable to a change in a physical address.

Selecting the victim page may be configured to select the victim page based on a Least Recently Used (LRU) algorithm or a Least Frequently Used (LFU) algorithm.

The hybrid memory management method may further include, when the new page is arranged and stored in the hybrid memory, declaring out-of-memory when an available space is not present in the area of the NVRAM either.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Advantages and features of the present invention and methods for achieving the same will be clarified with reference to embodiments described later in detail together with the accompanying drawings. However, the present invention is capable of being implemented in various forms, and is not limited to the embodiments described later, and these embodiments are provided so that this invention will be thorough and complete and will fully convey the scope of the present invention to those skilled in the art. The present invention should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present invention.

The terms used in the present specification are merely used to describe embodiments, and are not intended to limit the present invention. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present invention pertains. Further, terms defined in generally used dictionaries are not to be interpreted as having ideal or excessively formal meanings unless they are definitely defined in the present specification.

Hereinafter, an apparatus and method according to embodiments will be described in detail with reference to FIGS. 1 to 8.

Figure 1:
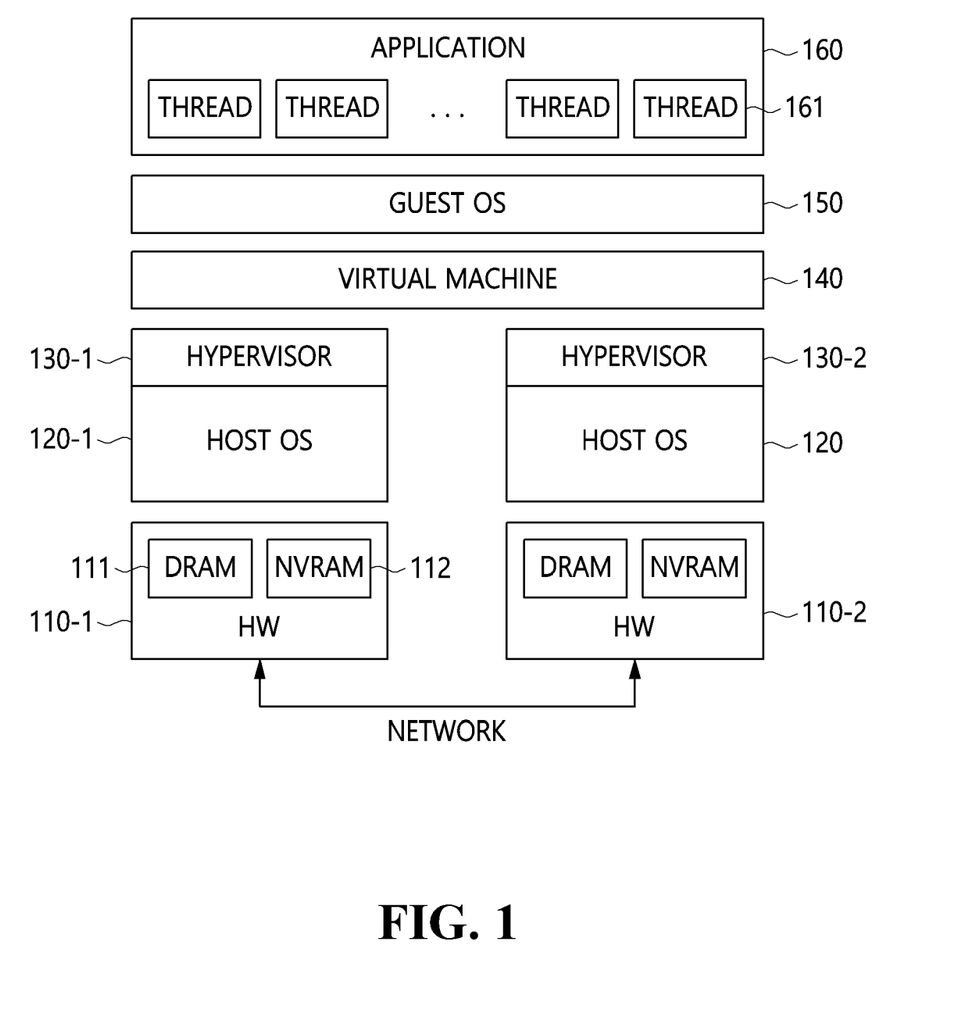
FIG. 1 is a configuration diagram illustrating the layered structure of an inverse-virtualization-based multi-node computing system to which the present invention is to be applied.

FIG. 1 is a configuration diagram illustrating the layered structure of an inverse-virtualization-based multi-node computing system to which the present invention is to be applied.

Referring to FIG. 1, in each of physical nodes (HW) 110-1 and 110-2, hybrid memory in which two or more different types of memory devices coexist is contained. In an example, as illustrated in FIG. 1, the two or more different types of memory devices may include DRAM 111, which is volatile memory, and Nonvolatile RAM (NVRAM) 112, which is nonvolatile memory.

Host operating systems (host OSs) 120-1 and 120-2 for respective nodes run on respective layers higher than the physical nodes 110-1 and 110-2.

Hypervisors 130-1 and 130-2 abstract respective resources of the physical nodes 110-1 and 110-2 into a virtual machine.

In an embodiment, as illustrated in FIG. 1, the hypervisors 130-1 and 130-2 may run on the host operating systems (host OSs) 120-1 and 120-2, and this process is referred to as "Type-2 virtualization".

In another embodiment, the hypervisors 130-1 and 130-2 may directly run alone on hardware without host operating systems, and this process is referred to as "Type-1 virtualization".

A virtual machine 140 is abstracted to encompass the resources of the multiple physical nodes 110-1 and 110-2, and a single guest operating system (guest OS) 150 runs on the virtual machine.

An application 160 is executed on the guest OS 150.

Here, in an embodiment, the application 160 may also be executed on a single physical node in the form of a single process.

In a further embodiment, the application 160 may be implemented in a form in which multiple threads 161 are executed in parallel, as illustrated in FIG. 1. In this case, multiple threads belonging to one process may be executed in parallel on multiple nodes while going beyond the boundary of a single physical node.

Meanwhile, the multiple physical nodes 110-1 and 110-2 are connected to each other over a network, thus enabling inter-node communication such as memory sharing.

The DRAM 111 and the NVRAM 112 of the hybrid memory contained in each of the physical nodes 110-1 and 110-2 may be mapped to a unique physical address, through which memory reference at the corresponding node may be made.

For this, in accordance with an embodiment, a memory manager is present at each node, and executes service for a memory reference request when the memory reference request is received from a remote node.

Figure 2:
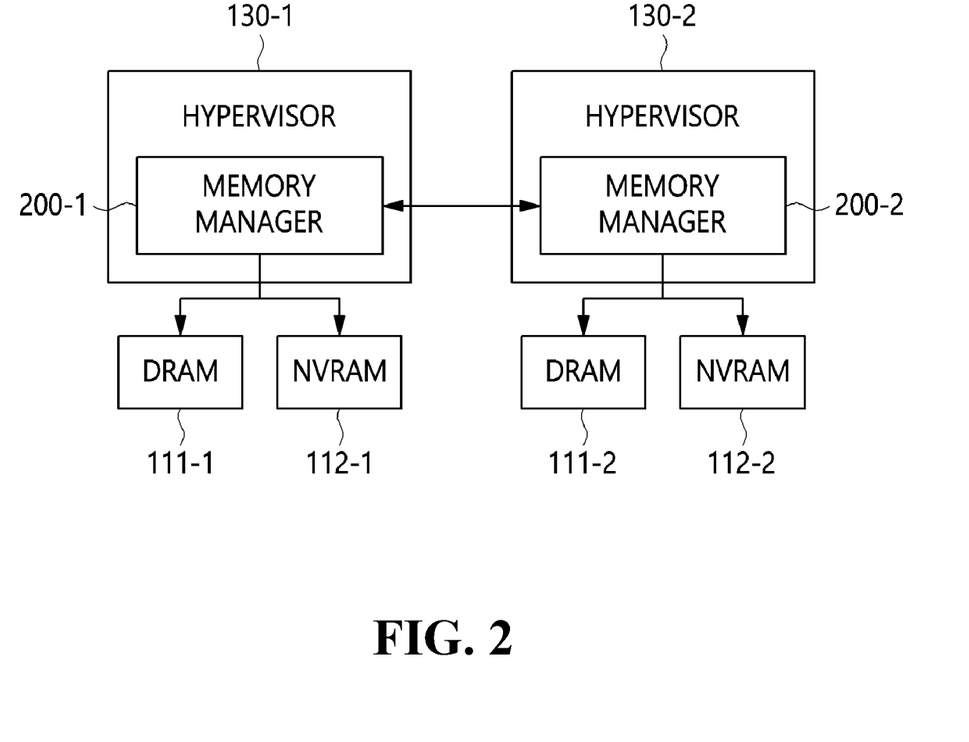
FIG. 2 is a diagram illustrating an example in which a memory manager is implemented according to an embodiment.

FIG. 2 is a diagram illustrating an example in which a memory manager is implemented according to an embodiment.

Referring to FIG. 2, memory managers 200-1 and 200-2 may be implemented in hypervisors 130-1 and 130-2 corresponding to physical nodes 110-1 and 110-2, respectively. Such memory managers 200-1 and 200-2 may process memory management between the physical nodes 110-1 and 110-2, management for respective layers of hybrid memory, and data movement.

Figure 3:
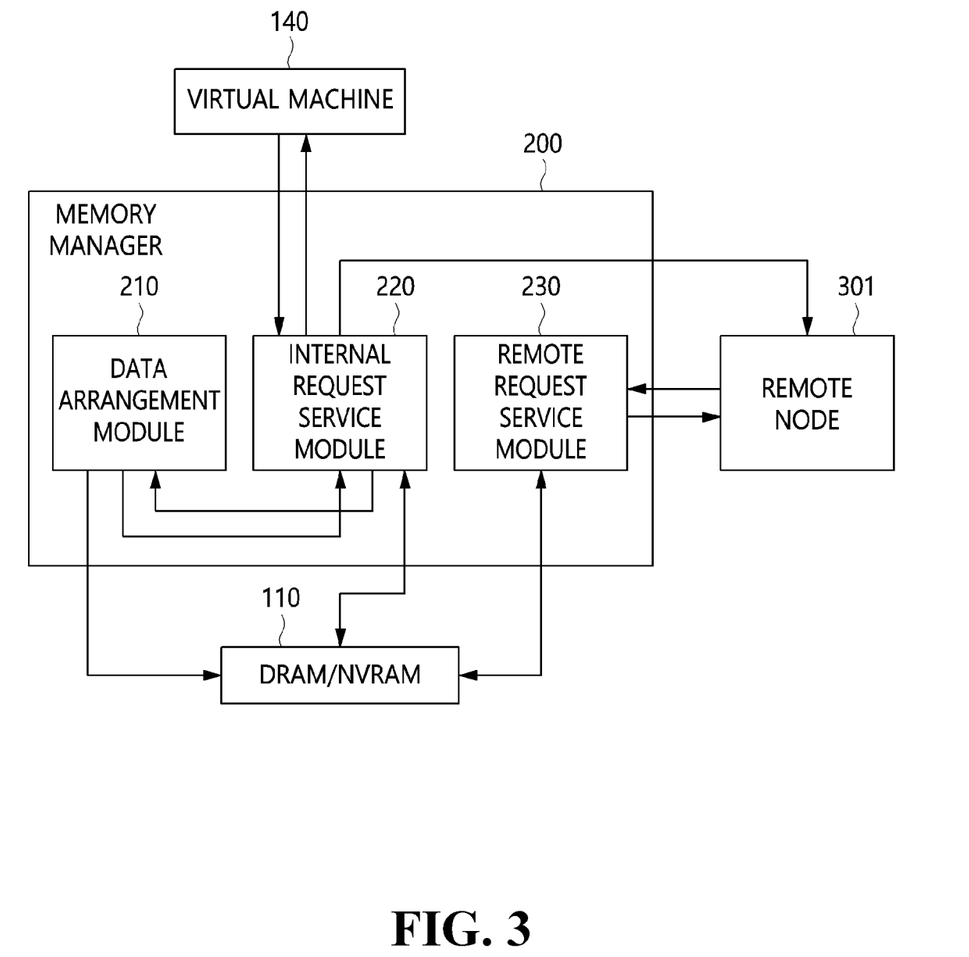
FIG. 3 is a block diagram illustrating the schematic internal configuration of a memory manager according to an embodiment.

FIG. 3 is a block diagram illustrating the schematic internal configuration of a memory manager according to an embodiment.

Referring to FIG. 3, a memory manager 200 according to the embodiment may mainly include a data arrangement module 210, an internal request service module 220, and a remote request service module 230.

The remote request service module 230 processes a page-related request, transferred from a remote node 301 in an many-to-one virtualization system, with reference to hybrid memory 110, and responds to the page-related request by transmitting the result of processing to the remote node 301. The detailed operation of the remote request service module 230 will be described in detail later with reference to FIG. 4.

The internal request service module 220 processes an internal page fault request transferred from the virtual machine 140 by referring to the hybrid memory 110 in a local node, or by requesting the remote node 301 to process the internal page fault request, and thereafter responds to the internal page fault request by transmitting the result of processing to the virtual machine 140. The detailed operation of the internal request service module 220 will be described in detail later with reference to FIG. 5.

The data arrangement module 210 determines and responds to a request received from the internal request service module 220 with regard to the one, among DRAM and NVRAM of the hybrid memory 110, in which a newly added page is to be located. The detailed operation of the data arrangement module 210 will be described in detail with reference to FIG. 6.

Further, if necessary, the data arrangement module 210 functions to periodically relocate pages previously stored in the hybrid memory. The detailed operation of the data arrangement module 210 will be described in detail later with reference to FIG. 7.

Figure 4:
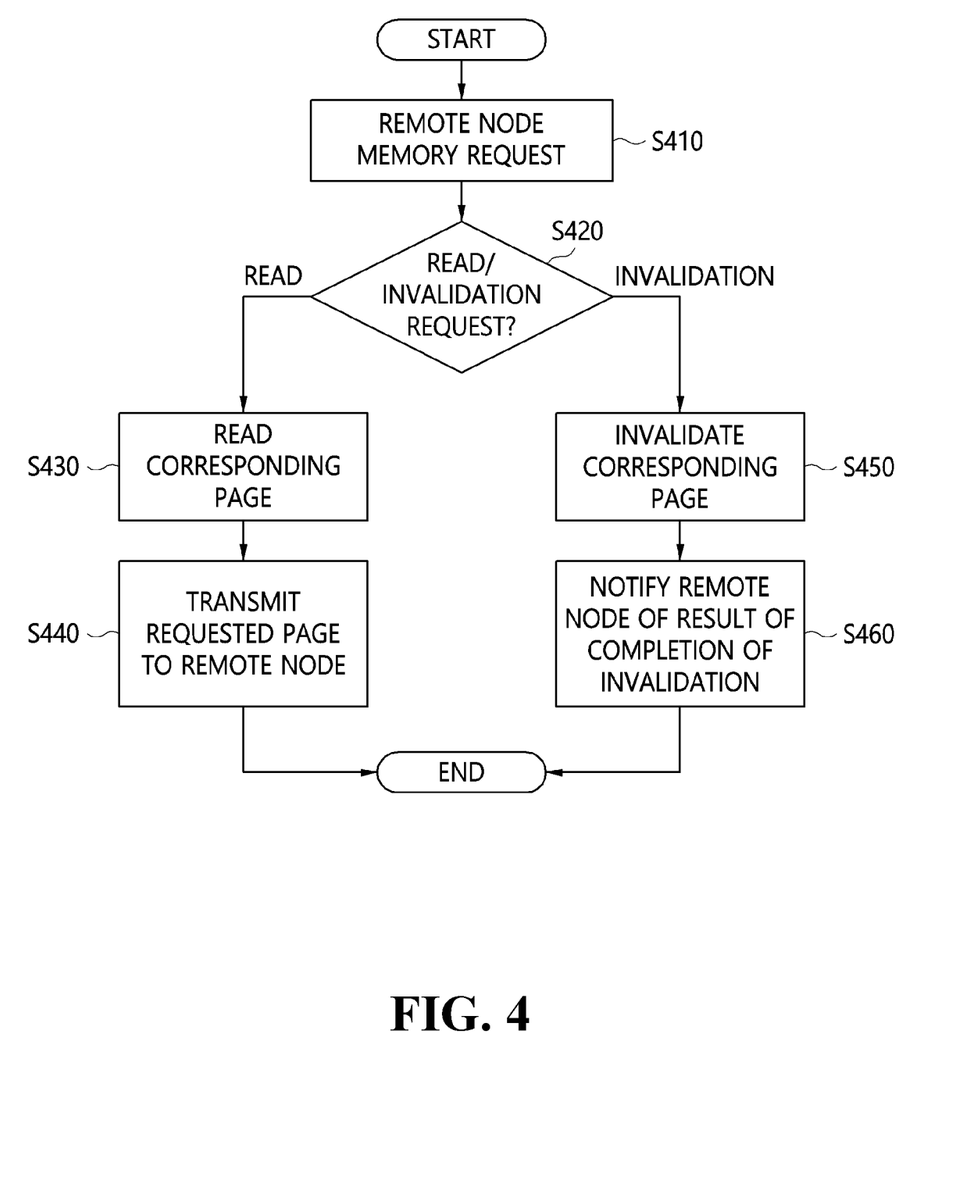
FIG. 4 is a flowchart illustrating a method for processing a remote node memory request according to an embodiment.

FIG. 4 is a flowchart illustrating a method for processing a remote node memory request according to an embodiment.

Referring to FIG. 4, when a memory request from the remote node 301 (i.e., a remote node memory request) is transferred at step S410, the remote request service module 230 determines whether the remote node memory request is a read request for page data stored in the corresponding node or an invalidation request for the page data at step S420.

If it is determined at step S420 that the remote node memory request is a read request, the remote request service module 230 reads the corresponding page with reference to the hybrid memory 110 at step S430, and thereafter transmits the read page to the remote node 301 at step S440.

In contrast, if it is determined at step S420 that the remote node memory request is an invalidation request, the remote request service module 230 invalidates the corresponding page with reference to the hybrid memory 110 at step S450, and thereafter notifies the remote node 301 of the result of completion of invalidation at step S460.

Figure 5:
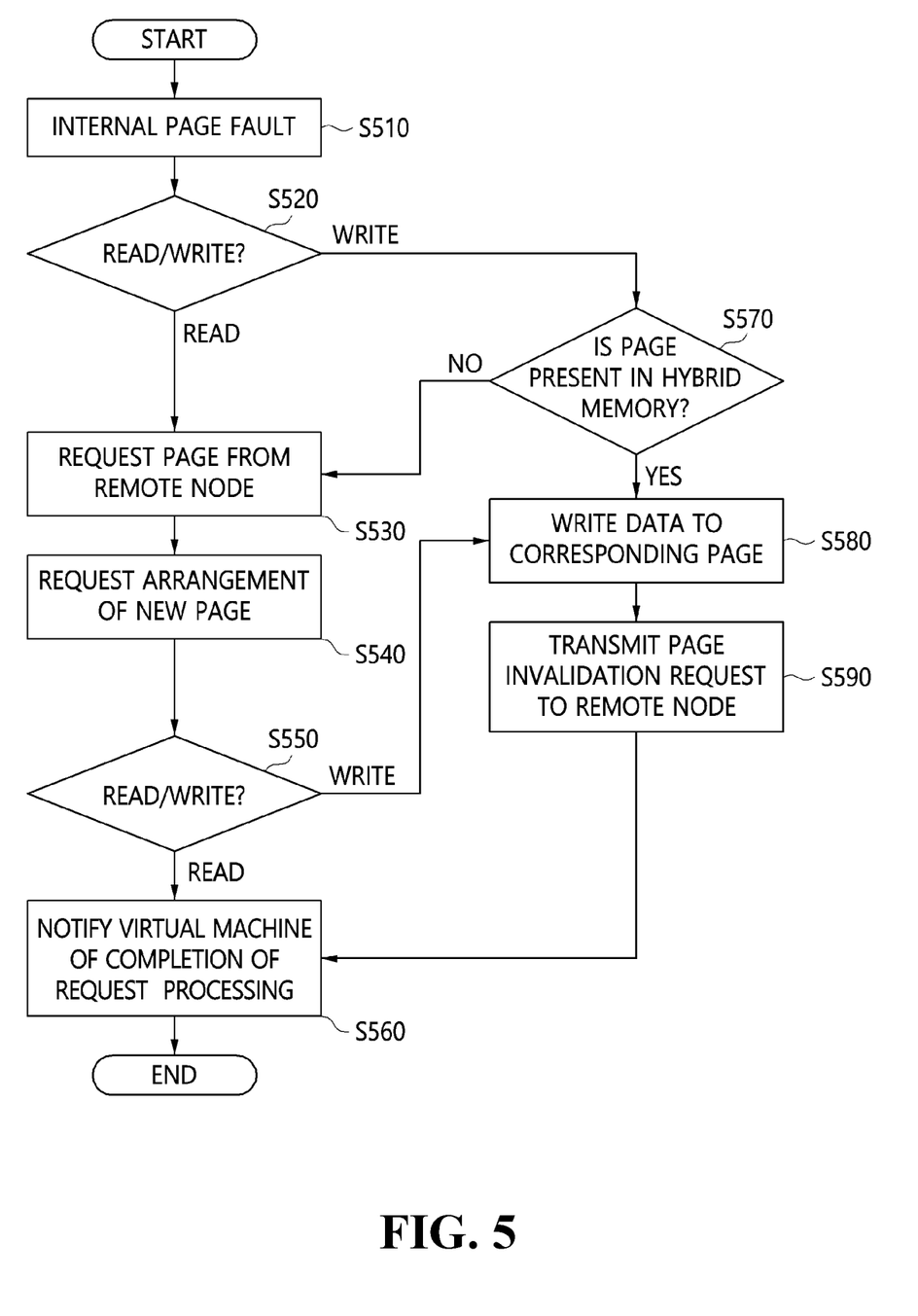
FIG. 5 is a flowchart illustrating a method for processing an internal node memory request according to an embodiment.

FIG. 5 is a flowchart illustrating a method for processing an internal node memory request according to an embodiment.

Referring to FIG. 5, when an internal page fault is generated by the virtual machine 140 at step S510, the internal request service module 220 checks whether the corresponding fault is a fault related to a read request or a write request at step S520.

If the internal page fault is found to be a fault related to a read request as a result of the checking at step S520, the internal request service module 220 requests page data from the remote node 301 containing the latest copy of the corresponding page, and acquires the requested page over a network at step S530.

Thereafter, the internal request service module 220 requests the data arrangement module 210 to arrange and store a new page that is the requested page in the hybrid memory at step S540. The operation of the data arrangement module 210 with regard to arrangement and storage of the new page in the hybrid memory will be described in detail later with reference to FIG. 6.

Thereafter, the internal request service module 220 notifies the virtual machine 140 that generated the page fault of completion of processing of the corresponding fault at step S560, and thereafter terminates the process.

In contrast, if the internal page fault is found to be a fault related to a write request as a result of the checking at step S520, the internal request service module 220 first determines whether the corresponding page is already present in the hybrid memory at step S570. The reason for performing step S570 is that the size of actual data to be applied to a write operation may be less than that of a page unit, and thus the corresponding page must be fetched through an external request when the corresponding page is not present in the hybrid memory.

That is, if it is determined at step S570 that the corresponding page is not already present in the hybrid memory, the internal request service module 220 performs steps S530 to S550, and thereafter proceeds to step S580.

It is determined at step S570 that the corresponding page is already present in the hybrid memory, or after steps S530 to S550 have been performed, the internal request service module 220 writes the data for which the write request is generated to the corresponding page at step S580. Here, because the data in the page has changed, all page copies present in the remote node must be invalidated.

Therefore, the internal request service module 220 transmits an invalidation request for the corresponding page to remote nodes having page copies over the network at step S590, notifies the virtual machine 140 of completion of fault processing at step S560, and then terminates the process.

Figure 6:
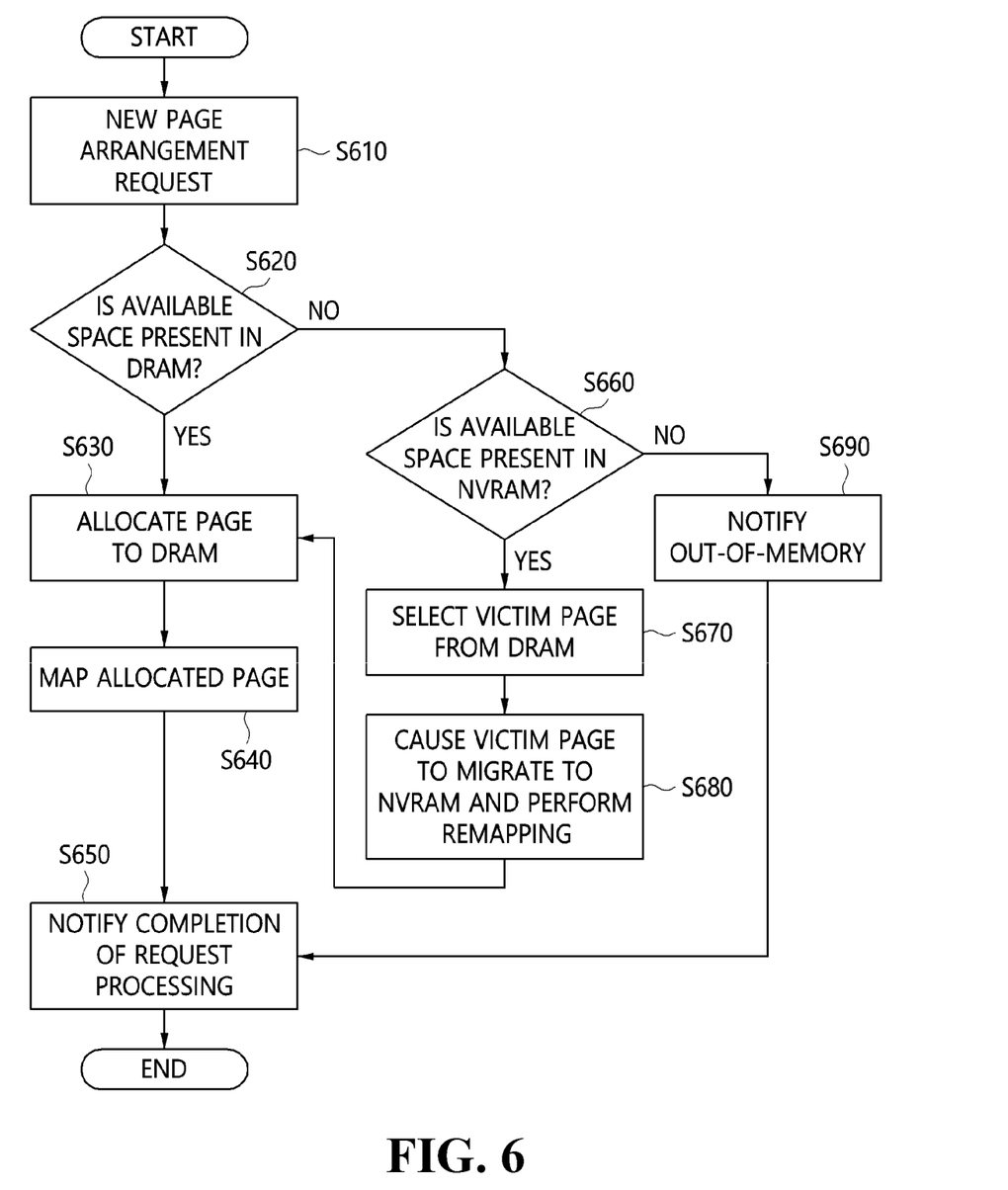
FIG. 6 is a flowchart illustrating in detail the step of processing a request to arrange a new page in hybrid memory in FIG. 5.

FIG. 6 is a flowchart illustrating in detail the step S540 of processing a request to arrange a new page in the hybrid memory in FIG. 5.

When an arrangement request for a new page is generated by the internal service request module 220 at step S610, the data arrangement module 210 determines whether available space to which the new page can be allocated is present in the area of DRAM at step S620. Here, the reason for preferentially considering DRAM is that DRAM is superior to NVRAM with regard to access performance.

If it is determined at step S620 that available space is present, the data arrangement module 210 allocates the new page to the available space at step S630 and performs mapping of the allocated page to user address space at step S640.

Thereafter, the data arrangement module 210 notifies the internal request service module 220 of completion of processing of the arrangement request at step S650 and then terminates the process.

In contrast, if it is determined at step S620 that no available space is present, the data arrangement module 210 determines whether available space is present in the area of NVRAM at step S660.

If it is determined at step S660 that available space is present in the area of NVRAM, the data arrangement module 210 selects a victim page to be migrated to the area of the NVRAM from among existing pages present in the DRAM at step S670.

Here, a criterion for selecting the victim page may vary with the system, and a representative policy for the criterion may include a Least Recently Used (LRU) algorithm, a Least Frequently Used (LFU) algorithm, etc.

After the data arrangement module 210 causes the selected victim page to migrate to the available space of the NVRAM, the arrangement module 210 again performs mapping of the corresponding page attributable to a change in a physical address at step S680, proceeds to step S630 of allocating the new page to the available space of the DRAM generated due to migration of the victim page, and performs steps S640 and S650.

In this way, the reason for always allocating the new page to the area of the DRAM is to take into consideration the temporal locality of page data.

Meanwhile, if it is determined at step S660 that no available space is present in the area of NVRAM, no more new pages can be added to the hybrid memory, and thus the data arrangement module 210 declares lack of memory (out-of-memory) at step S680 and terminates the process.

Figure 7:
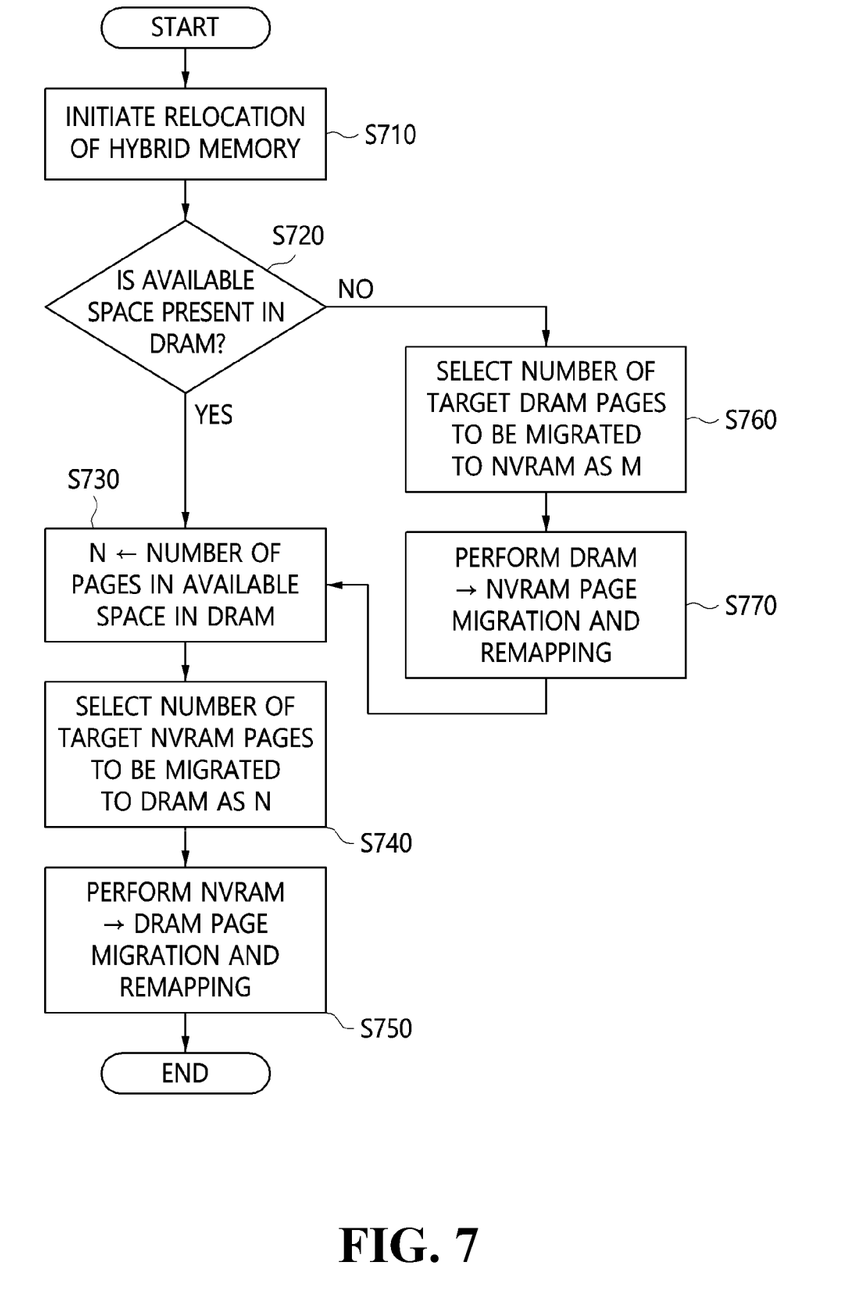
FIG. 7 is a flowchart illustrating the step of arranging existing pages stored in hybrid memory according to an embodiment.

FIG. 7 is a flowchart illustrating the step of arranging existing pages stored in the hybrid memory according to an embodiment.

This process is intended to cause pages that are currently present in DRAM, but are less frequently accessed, to migrate to NVRAM, and pages of the NVRAM that are predicted to be accessed in the near future to migrate to DRAM in advance, thus improving memory access performance. This process may be performed at intervals of a preset period, which can be variably set.

When the task of relocating the existing pages stored in the hybrid memory is initiated at step S710, the data arrangement module 210 first determines whether available space is present in DRAM at step S720.

If it is determined at step S720 that available space is present in the DRAM, when the number of pages in the available space of the DRAM is N at step S730, the data arrangement module 210 may select the number of target NVRAM pages to be migrated to the DRAM as N at step S740.

Here, a criterion for selection may be variously designated according to the system, similar to the case where victim pages are selected upon arranging the new page, and a Most Recently Used (MRU) algorithm, a Most Frequently Used (MFU) algorithm or the like in which the frequency of recent access, the accumulated number of accesses, or the like is taken into consideration may be utilized.

The data arrangement module 210 causes the selected NVRAM pages to migrate to the DRAM, again performs mapping of the corresponding pages at step S750, and then terminates the process.

Meanwhile, if it is determined at step S720 that no available space is present in the DRAM, the data arrangement module 210 selects the number of target DRAM pages to be migrated to the NVRAM as M at step S760.

Here, the value of "M" may be a value predefined in the system, and may vary with the system situation. The criterion for selection of the target DRAM pages may be variously applied in consideration of the frequency of recent access, the accumulated number of accesses, or the like in the same way as the NVRAM page selection criterion.

Thereafter, the data arrangement module 210 causes the selected M DRAM pages to migrate to the NVRAM, and again performs mapping of the migrated pages in the same way at step S770.

Then, for the available space of the DRAM corresponding to M pages, generated as described above, the data arrangement module 210 performs migration of NVRAM pages at steps S730 to S750 in the same way, and terminates the process. Here, the value of N is identical to that of M.

Figure 8:
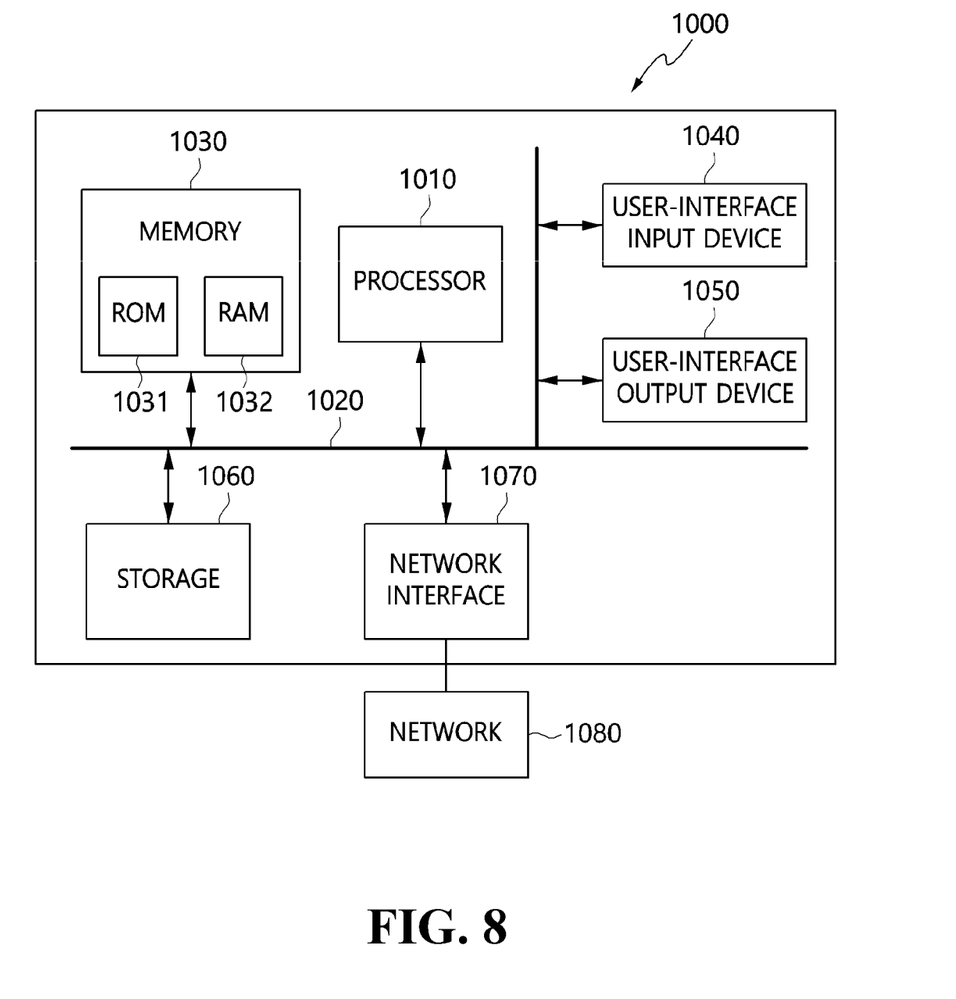
FIG. 8 is a diagram illustrating the configuration of a computer system according to an embodiment.

FIG. 8 is a diagram illustrating the configuration of a computer system according to an embodiment.

A hybrid memory management apparatus for an many-to-one virtualization environment according to an embodiment may be implemented in a computer system 1000 such as a computer-readable storage medium.

The computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080. Each processor 1010 may be a Central Processing Unit (CPU) or a semiconductor device for executing programs or processing instructions stored in the memory 1030 or the storage 1060. Each of the memory 1030 and the storage 1060 may be a storage medium including at least one of a volatile medium, a nonvolatile medium, a removable medium, a non-removable medium, a communication medium, or an information delivery medium. For example, the memory 1030 may include Read-Only Memory (ROM) 1031 or Random Access Memory (RAM) 1032.

In accordance with embodiments, in an many-to-one virtualization system in which multiple nodes, each containing hybrid memory in which two or more different types of memory devices coexist, are combined with each other, optimized performance may be expected through efficient memory management. A user application may utilize distributed hybrid memory without modification of code, and may utilize large-scale memory space based on high integration of NVRAM while minimizing deterioration of performance attributable to NVRAM through allocation for respective layers of hybrid memory, page migration of the hybrid memory, or the like in consideration of access patterns.

Although the embodiments of the present invention have been disclosed with reference to the attached drawing, those skilled in the art will appreciate that the present invention can be implemented in other concrete forms, without changing the technical spirit or essential features of the invention. Therefore, it should be understood that the foregoing embodiments are merely exemplary, rather than restrictive, in all aspects.

What is claimed is:

1. A hybrid memory management apparatus for an many-to-one virtualization environment, the hybrid memory management apparatus being a memory management apparatus in an inverse-virtualization-based multi-node computing system including multiple physical nodes, each containing a hybrid memory in which two or more different types of memory devices coexist, a virtual machine in which resources of the multiple physical nodes are virtualized, and hypervisors for abstracting respective resources of the physical nodes into the virtual machine and corresponding to respective physical nodes, wherein:

the hybrid memory management apparatus is implemented in each of the hypervisors to manage the hybrid memory, the hybrid memory management apparatus comprising:

a memory for storing at least one program; and a processor for executing the program, wherein the program comprises:

a remote request service module for processing a page-related request received from a remote node with reference to the hybrid memory and responding to the page-related request by transmitting a result of processing to the remote node;

an internal request service module for processing an internal page fault request received from the virtual machine with reference to a hybrid memory of a local or remote node and responding to the internal page fault request by transmitting a result of processing to the virtual machine; and a data arrangement module for responding to an inquiry request for a location at which a newly added page is to be arranged in the hybrid memory, the inquiry request being made by the internal request service module.

2. The hybrid memory management apparatus of claim 1, wherein the remote service request module performs:

determining whether a memory request received from a remote node is a read request or an invalidation request for page data stored in the remote node; and selectively performing, based on a result of the determination, any one of:

an operation of reading the corresponding page with reference to the hybrid memory and then transmitting the read page to the remote node, which transmitted the memory request, and an operation of invalidating the corresponding page with reference to the hybrid memory and thereafter notifying the remote node, which transmitted the memory request, that invalidation has been completed over a network.

3. The hybrid memory management apparatus of claim 1, wherein the internal request service module performs:

when an internal page fault is generated by the virtual machine, checking whether the internal page fault is a fault related to a read request or a write request; and selectively performing, based on a result of the checking, any one of:

an operation of, if the internal page fault is found to be a fault related to a read request, requesting page data from a remote mode having a latest copy of the corresponding page, and requesting the data arrangement module to arrange and store a new page that is the corresponding page in the hybrid memory when the requested page is received over a network, and an operation of, if the internal page fault is found to be a fault related to a write request, writing data for which the write request is generated to the corresponding page, and requesting invalidation of all of page copies present in other nodes.

4. The hybrid memory management apparatus of claim 3, wherein the internal request service module further performs:

when the internal page fault is found to be the fault related to the write request, determining whether the corresponding page is already present in the hybrid memory; and when the corresponding page is not present in the hybrid memory, requesting page data from a remote node having a latest copy of the corresponding page, and requesting the data arrangement module to arrange and store the new page that is the corresponding page in the hybrid memory when the requested page is received over the network.

5. The hybrid memory management apparatus of claim 4, wherein:

the two or more different types of memory devices comprise a Dynamic Random Access Memory (DRAM) and a Nonvolatile RAM (NVRAM), and the data arrangement module performs:

when a request to arrange a new page is generated by the internal request service module, allocating the new page to an available space, to which the new page is allocable, in an area of the DRAM;

performing mapping of the allocated new page to a user address space; and notifying the internal request service module of completion of processing of the arrangement request.

6. The hybrid memory management apparatus of claim 5, wherein the data arrangement module further performs:

when an available space to which the new page is allocable is not present in the area of the DRAM, determining whether an available space is present in an area of the NVRAM;

selecting a victim page to be migrated to the available space in the area of the NVRAM from among existing pages present in the DRAM; and after causing the selected victim page to migrate to the available space, again performing mapping of the corresponding page attributable to a change in a physical address.

7. The hybrid memory management apparatus of claim 6, wherein selecting the victim page is configured to select the victim page based on a Least Recently Used (LRU) algorithm or a Least Frequently Used (LFU) algorithm.

8. The hybrid memory management apparatus of claim 6, wherein the data arrangement module performs declaring out-of-memory when an available space is not present in the area of the NVRAM either.

9. The hybrid memory management apparatus of claim 1, wherein:
the two or more different types of memory devices comprise a DRAM and an NVRAM, and
the data arrangement module comprises:
with initiation of a reallocation task, when N available pages are present in an available space of an area of the DRAM, selecting a number of target NVRAM pages to be migrated to the DRAM as N; and
after causing the selected NVRAM pages to migrate to the DRAM, again performing mapping of the corresponding pages.

10. The hybrid memory management apparatus of claim 9, wherein the data arrangement module further performs:
when no available space is present in the area of the DRAM, selecting a number of target DRAM pages to be migrated to the NVRAM as M; and
causing the selected M DRAM pages to migrate to the NVRAM;
selecting a number of target NVRAM pages to be migrated to the DRAM as N; and
after causing the selected NVRAM pages to migrate to the DRAM, and again performing mapping of the corresponding pages.

11. The hybrid memory management apparatus of claim 10, wherein the data arrangement module is configured to, when selecting the number of the target NVRAM pages to be migrated as N or selecting the number of the target DRAM pages to be migrated as M, select the number based on a Most Recently Used (MRU) algorithm or a Most Frequently Used (MFU) algorithm in which a frequency of recent access or an accumulated number of accesses is taken into consideration.

12. A hybrid memory management method for an many-to-one virtualization environment, the hybrid memory management method being performed by a memory management apparatus implemented in each hypervisor in an inverse-virtualization-based multi-node computing system including multiple physical nodes, each containing a hybrid memory in which two or more different types of memory devices coexist, a virtual machine in which resources of the multiple physical nodes are virtualized, and hypervisors for abstracting respective resources of the physical nodes into the virtual machine and corresponding to respective physical nodes, the hybrid memory management method comprising:
determining whether a memory request received from a remote node is a read request or an invalidation request for page data stored in the remote node; and
selectively performing, based on a result of the determination, any one of:
an operation of reading the corresponding page with reference to the hybrid memory and then transmitting the read page to the remote node, which transmitted the memory request, and
an operation of invalidating the corresponding page with reference to the hybrid memory and thereafter notifying the remote node, which transmitted the memory request, that invalidation has been completed over a network.

13. A hybrid memory management method for an many-to-one virtualization environment, the hybrid memory management method being performed by a memory management apparatus implemented in each hypervisor in an inverse-virtualization-based multi-node computing system including multiple physical nodes, each containing a hybrid memory in which two or more different types of memory devices coexist, a virtual machine in which resources of the multiple physical nodes are virtualized, and hypervisors for abstracting respective resources of the physical nodes into the virtual machine and corresponding to respective physical nodes, the hybrid memory management method comprising:
when an internal page fault is generated by the virtual machine, checking whether the internal page fault is a fault related to a read request or a write request; and
selectively performing, based on a result of the checking, any one of:
an operation of, if the internal page fault is found to be a fault related to a read request, requesting page data from a remote mode having a latest copy of the corresponding page, and arranging and storing a new page that is the corresponding page in the hybrid memory when the requested page is received over a network, and
an operation of, if the internal page fault is found to be a fault related to a write request, writing data for which the write request is generated to the corresponding page, and requesting invalidation of all of page copies present in the remote node.

14. The hybrid memory management method of claim 13, wherein requesting the invalidation comprises:
when the internal page fault is found to be the fault related to the write request, determining whether the corresponding page is already present in the hybrid memory; and
when the corresponding page is not present in the hybrid memory, requesting page data from a remote node having a latest copy of the corresponding page, and arranging and storing the new page in the hybrid memory when the requested page is received over the network.

15. The hybrid memory management method of claim 14, wherein:
the two or more different types of memory devices comprise a dynamic random access memory (DRAM) and a nonvolatile RAM (NVRAM), and
the hybrid memory management method further comprises:
when the new page is arranged and stored in the hybrid memory, allocating the new page to an available space, to which the new page is allocable, in an area of the DRAM; and
performing mapping of the allocated new page to a user address space.

16. The hybrid memory management method of claim 15, further comprising:
when the new page is arranged and stored in the hybrid memory, if an available space to which the new page is allocable is not present in the area of the DRAM, determining whether an available space is present in an area of the NVRAM;

selecting a victim page to be migrated to the available space in the area of the NVRAM from among existing pages present in the DRAM; and after causing the selected victim page to migrate to the available space in the area of the NVRAM, again performing mapping of the corresponding page attributable to a change in a physical address.

17. The hybrid memory management method of claim 16, wherein selecting the victim page is configured to select the victim page based on a Least Recently Used (LRU) algorithm or a Least Frequently Used (LFU) algorithm.

18. The hybrid memory management method of claim 16, further comprising:

when the new page is arranged and stored in the hybrid memory, declaring out-of-memory when an available space is not present in the area of the NVRAM either.

* * * * *